H. K. KOUYOUMJIAN.
ELECTRIC FAN AND GENERATOR.
APPLICATION FILED DEC. 23, 1912.

1,219,562.

Patented Mar. 20, 1917.
3 SHEETS—SHEET 1.

H. K. KOUYOUMJIAN.
ELECTRIC FAN AND GENERATOR.
APPLICATION FILED DEC. 23, 1912.
1,219,562.
Patented Mar. 20, 1917.
3 SHEETS—SHEET 2.
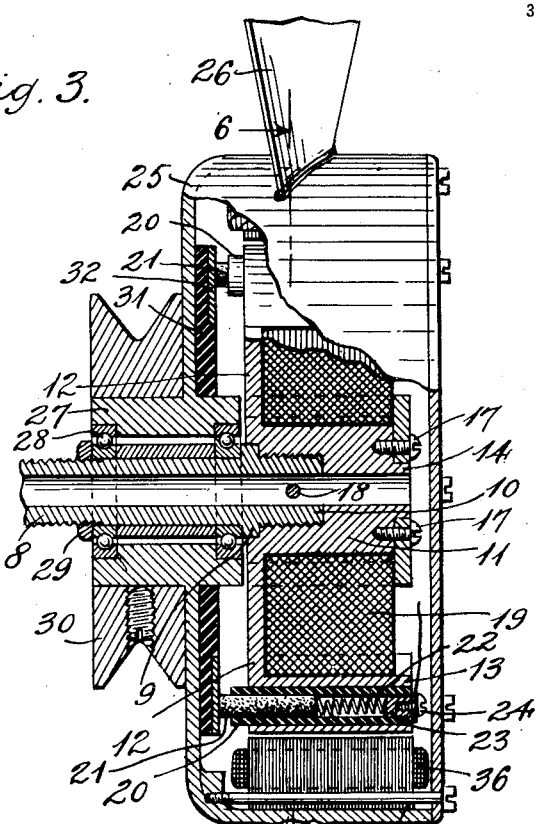
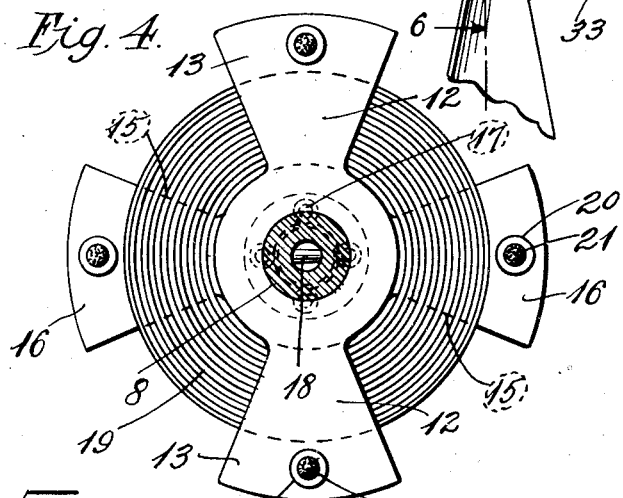
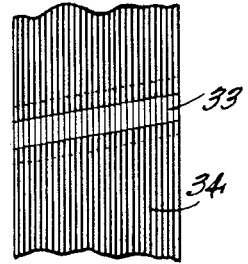

UNITED STATES PATENT OFFICE.

HAROUTIUN K. KOUYOUMJIAN, OF CLEVELAND, OHIO, ASSIGNOR TO THE KEMCO ELECTRIC MANUFACTURING COMPANY, OF CLEVELAND, OHIO, A CORPORATION OF OHIO.

ELECTRIC FAN AND GENERATOR.

1,219,562.        Specification of Letters Patent.     Patented Mar. 20, 1917.

Application filed December 23, 1912. Serial No. 738,233.

*To all whom it may concern:*

Be it known that I, HAROUTIUN K. KOUYOUMJIAN, a subject of the Sultan of Turkey, residing at Cleveland, in the county of Cuyahoga and State of Ohio, have invented certain new and useful Improvements in Electric Fans and Generators, of which the following is a specification.

This invention relates to a combined radiator cooling fan and generator unit for motor vehicles, and particularly to the arrangement and location of the unit with respect to the engine and radiator and to the manner of supporting and driving the unit.

The invention may be further briefly summarized as consisting in the construction and combination of parts hereinafter set forth in the following description, drawings and claims.

Figure 1:
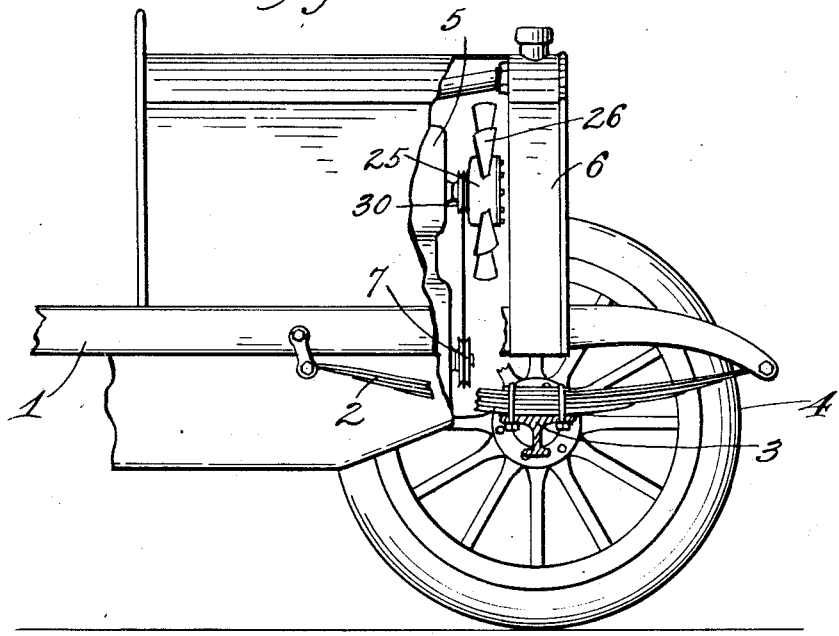
Figure 2:
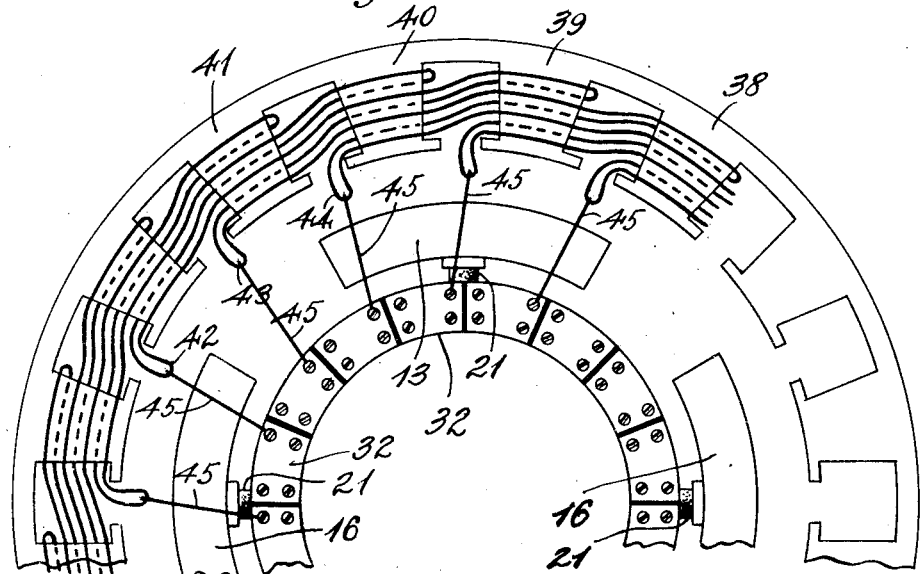
Figure 6:
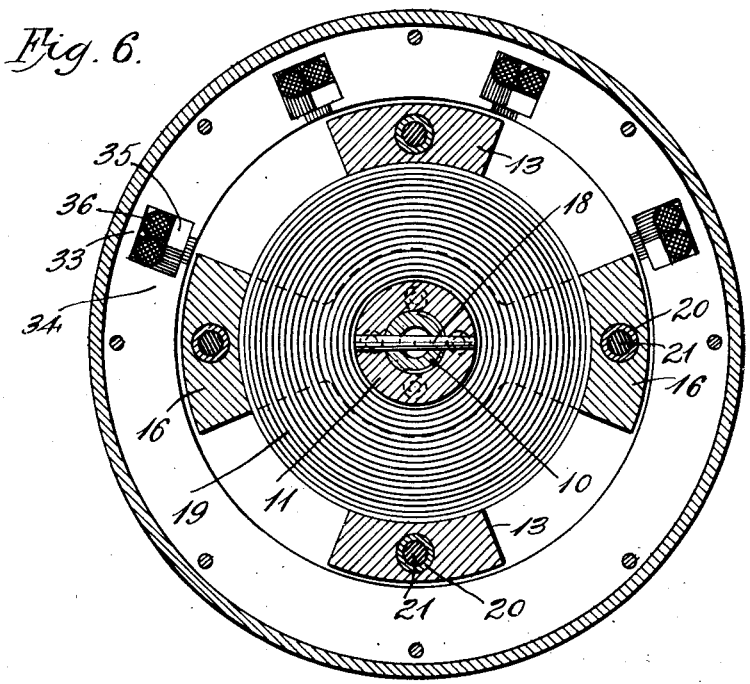
Figure 7:
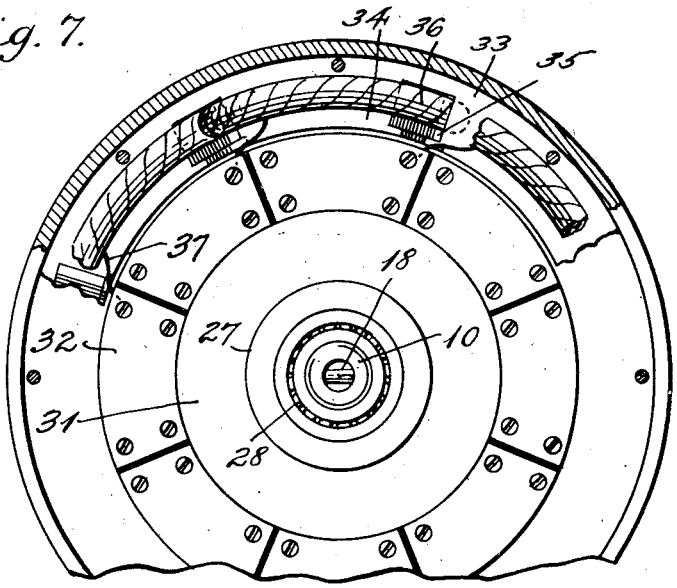

Referring to the drawings, Figure 1 is a side elevation of parts of the forward portion of a motor vehicle showing a portion of the engine with a generator fan mounted in place; Fig. 2 is a diagrammatic view showing the preferred form of winding for the generator; Fig. 3 is a view partly in elevation and partly in section showing the relation of the parts; Fig. 4 is a side elevation of the field magnet; Fig. 5 is a view of a portion of the armature core looking toward the inner periphery thereof; Fig. 6 is a sectional view through the casing, armature, and field magnet of the generator, the section being taken substantially along the line 6—6 of Fig. 3, looking in the direction indicated by the arrows; Fig. 7 is an inner end elevation of a portion of the casing looking toward the commutator end and showing a part of the armature.

In carrying out the invention any preferred form and construction of parts may be employed so long as they possess the necessary characteristics, but I have shown one embodiment which is effective in operation, and in this arrangement, 1 represents the frame of a motor vehicle supported on suitable springs 2 which are carried by the axle 3 in turn supported on suitable wheels 4. The frame 1 carries an engine 5 and a radiator 6. The engine 5 is provided with a drive pulley 7 which forms a drive for the combined generator and fan to be described.

The fan generator consists of a hollow supporting shaft 8 rigidly mounted in a suitable support and having at its outer end a shoulder 9 and an extended threaded shank 10, the latter being threaded into a field magnet core 11. This core is provided at opposite ends with radially extending webs provided at their outer ends with laterally projecting segment-shaped field poles, the webs and poles supported at one end of the core being displaced 180° from the webs and poles at the opposite ends of the core. The webs 12 at one end of the core are preferably integral with the core and are provided with poles 13, and the webs 15 having poles 16 are secured to the opposite end of the core by screws 17, the said webs 15 having a substantially annular central portion surrounding a projection 14 at the end of the core.

Surrounding the magnet 11 and between the webs 12 and 15 is a suitable field coil 19 and one of the two leads from this coil passes to either one of the pair of brushes mounted in the field poles 13, while the other lead passes to either one of a pair of brushes mounted in the field poles 16. The brushes referred to are four in number and there is one in each field pole, and each comprises an insulating tube 20 secured in an opening in a field pole and carrying with it a carbon or other brush 21, forced out through the end of the tube by means of a spring 22 held in place by a brass or other plug 23 threaded into the end of the tube and having a binding screw 24 in its outer end by which a wire leading from the generator is connected and also by means of which a wire connecting opposed brushes may be connected.

Coöperating with the stationary field magnet is a casing member 25 provided upon its periphery with fan blades 26 adapted to cool the radiator in the usual manner. This casing 25 is preferably formed integral with the hub 27 which is mounted upon suitable ball bearings 28 upon the shaft 8. These bearing parts are held in place by a suitable nut 29 against the shoulder 9. Secured to this hub 27 is a driving pulley 30 of any preferred construction. Within the casing the flat face is provided with a suitable commutator plate 31 preferably of fiber, and provided with eight commutator segments 32 which are spaced apart in the usual manner and are located so that they coöperate with the brushes 21. The casing 25 also receives a rotating armature comprising an annular laminated core 33 having on its inner periphery teeth 34 and slots 35 for the reception of the winding 36 which in Figs. 3, 6 and 7 is shown in the form of individual coils passing around each armature section for the sake of simplicity in illustration, but which is preferably in the form shown in the diagrammatic view in Fig. 2. This winding will be later described.

In the arrangement shown in Fig. 7 each coil is connected to the preceding commutator sections by means of a wire or connection 37, and this is rendered necessary by reason of the fact that the current must be collected from the neutral point, and since the brushes are carried by the field poles or field segments, the current must be collected from the segment adjacent to the pole, and this segment must receive its current from the coil to the rear of the pole with respect to the direction of rotation.

As hereinbefore stated, diametrically opposed brushes are connected together and one of each pair of diametrically opposed brushes is connected to one of the leads passing from the generator and these leads pass through the opening in the hollow shaft 8 and in the armature 11.

The preferred form of winding for the generator is the one illustrated in a diagrammatic way in Fig. 2, and in this arrangement, the field poles 13 and 16 have their brushes 21 extending inward toward the commutator segments 32 and each field pole is shown as being radially disposed with respect to a corresponding commutator segment. The armature is shown as having four of its sections, teeth or polar projections which for convenience will be indicated in this figure by 38, 39, 40 and 41, arranged so that they are radially disposed with respect to a field pole and two commutator segments. Then, for the purpose of clearness, starting with a single wire at the point 42, the wire passes upon the outside of four armature sections as far as 39, passes back under three armature sections to armature section 41 and forms a loop at 43. The wire then passes on the outside of the armature sections 41, 40, 39 and 38, thence under the armature sections 38, 39 and 40 and forms a loop at 44. This operation is continued until the sixteen armature sections of the armature core are wound and the ends of the wires are connected to form a loop similar to the loops 42, 43 and 44. The loops are then connected to commutator sections by wires 45 and the arrangement is such that the brush of any field pole is collecting current from the coils of wire preceding the radial position of the pole and with respect to the direction of rotation.

It will therefore be seen that I have provided a compact construction which is suitable for use in the narrow or small available space between the engine and radiator. It would be observed also that this unit is supported solely at one end thereof which is next to the engine, and that the pulley which drives the unit or rotates the casing with the parts carried thereby is close to the support, as is desirable.

While I have explained in considerable detail the preferred construction of the unit and particularly of the generator, I do not wish to be confined to the details shown, as any other construction which answers the requirements may be employed.

Having described my invention, I claim:—

1. In combination with the engine and radiator of a motor vehicle, of a combined radiator cooling fan and generator unit mounted between the engine and radiator, said unit being supported solely at one end which is adjacent the engine, and a driving pulley at the same end of the unit and located adjacent the support for the unit.

2. In combination with the engine and radiator of a motor vehicle, of a combined radiator cooling fan and generator unit comprising a shaft, stationary and rotary generator elements and a rotary casing having fan blades and inclosing said elements of the generator, said unit being supported solely at one end which is adjacent the engine and a driving pulley located at said end of the unit adjacent the support for the unit.

3. In combination with the engine and radiator of a motor vehicle, of a combined radiator cooling fan and generator unit comprising a fixed shaft, field and armature elements one carried by the shaft, a flat commutator arranged adjacent the field and armature elements, a rotary casing inclosing all said parts of the generator, said casing having fan blades and supported on the shaft at the end of the casing next to the engine, said unit being supported from the engine at one end only, and a driving pulley for rotating the casing, said pulley being at the end of the unit next to the engine and adjacent to the point of support of the unit.

In testimony whereof I affix my signature in presence of two witnesses.

HAROUTIUN K. KOUYOUMJIAN.

Witnesses:
G. O. FARQUHARSON,
C. H. TRESCH.